United States Patent
Chuang

(10) Patent No.: US 9,313,308 B2
(45) Date of Patent: Apr. 12, 2016

(54) METHOD OF ESTABLISHING LINKS BETWEEN CONTACT INFORMATION ACCORDING TO DATA VALIDITY OF ELEMENTARY FILES STORED IN SMARTCARDS

(71) Applicant: ACER INCORPORATED, New Taipei (TW)

(72) Inventor: Chia-Yun Chuang, New Taipei (TW)

(73) Assignee: ACER INCORPORATED, Xizhi Dist., New Taipei (TW)

( * ) Notice: Subject to any disclaimer, the term of this patent is extended or adjusted under 35 U.S.C. 154(b) by 0 days.

(21) Appl. No.: 14/492,069

(22) Filed: Sep. 21, 2014

(65) Prior Publication Data

US 2015/0111613 A1   Apr. 23, 2015

Related U.S. Application Data

(60) Provisional application No. 61/894,439, filed on Oct. 23, 2013.

(30) Foreign Application Priority Data

Apr. 7, 2014   (TW) .............................. 103112735 A

(51) Int. Cl.
*H04B 1/38*   (2015.01)
*H04M 1/2745*   (2006.01)

(52) U.S. Cl.
CPC .............................. *H04M 1/274533* (2013.01)

(58) Field of Classification Search
CPC .................... H04M 1/274533; H04W 8/183
USPC ........................................................ 455/558
See application file for complete search history.

(56) References Cited

U.S. PATENT DOCUMENTS

2013/0262375 A1*   10/2013   Lin ................................ 707/609

OTHER PUBLICATIONS

ETSI TS 131 102 V8.4.0 (Jan. 2009).*

* cited by examiner

*Primary Examiner* — Tanmay Shah
(74) *Attorney, Agent, or Firm* — Winston Hsu; Scott Margo

(57) ABSTRACT

During the booting process of a mobile device inserted with a smartcard, it is determined whether a link indicated by an index administration phone book elementary file is correct according to data validity of the index administration phone book elementary file and an abbreviated dialing number elementary file. When a valid pointer indicated by index administration phone book elementary file corresponds to invalid data of the index administration phone book elementary file, the index administration phone book elementary file is updated to indicate an invalid pointer, thereby preventing the mobile device from displaying blank contact information.

8 Claims, 4 Drawing Sheets

EFPBR     11

| Identifier: '4F30' | Structure: linear fixed | Conditional (see Note) |
|---|---|---|
| Record Length: X bytes | Update activity: low | |

Access Conditions:
    READ          PIN
    UPDATE      ADM
    DEACTIVATE ADM
    ACTIVATE   ADM

| Bytes | Description | M/O | Length |
|---|---|---|---|
| 1 to X | TLV object(s) for indicating EFs that are part of the phone book structure | M | X bytes |

NOTE: This file is mandatory if and only if DF Phonebook is present.

EF_IAP

| Identifier: '4FXX' | Structure: linear fixed | Conditional (see Note) |
|---|---|---|
| SFI: 'YY' | | |
| Record Length: X bytes, (X ≥ 1) | Update activity: low | |

Access Conditions:
    READ           PIN
    UPDATE       PIN
    DEACTIVATE  ADM
    ACTIVATE    ADM

| Bytes | Description | M/O | Length |
|---|---|---|---|
| 1 | Record number of the first object indicated after Tag 'A9' | M | 1 bytes |
| 2 | Record number of the second object indicated after Tag 'A9' | C | 1 bytes |
| X | Record number of the $x^{th}$ object indicated after Tag 'A9' | C | 1 bytes |

NOTE 1:    This file is mandatory if and only if type 2 files are present.
NOTE 2:    $x^{th}$-field marked with 'C' is mandatory if $x^{th}$-object indicated following tag 'A9' is present in EF_PBR

FIG. 3 PRIOR ART

EF_ADN 15

| Identifier: '4FXX' | Structure: linear fixed | Conditional (see Note) |
|---|---|---|
| SFI: 'YY' | | |
| Record length: X+14 bytes | Update activity: low | |
| Access Conditions: <br> READ PIN <br> UPDATE PIN <br> DEACTIVATE ADM <br> ACTIVATE ADM | | |

| Bytes | Description | M/O | Length |
|---|---|---|---|
| 1 to X | Alpha Identifier | O | X bytes |
| X+1 | Length of BCD number/SSC contents | M | 1 bytes |
| X+2 | TON and NPI | M | 1 bytes |
| X+3 to X+12 | Dialling Number/SSC String | M | 10 bytes |
| X+13 | Capability/Configuration1 Record Identifier | M | 1 bytes |
| X+14 | Extension1 Record Identifier | M | 1 bytes |

NOTE: This file is mandatory if and only if DF_PHONEBOOK is present.

FIG. 4 PRIOR ART

METHOD OF ESTABLISHING LINKS BETWEEN CONTACT INFORMATION ACCORDING TO DATA VALIDITY OF ELEMENTARY FILES STORED IN SMARTCARDS

CROSS REFERENCE TO RELATED APPLICATIONS

This application claims the benefit of U.S. provisional application No. 61/894,439 filed on 2013 Oct. 23.

BACKGROUND OF THE INVENTION

1. Field of the Invention

The present invention is related to a method of establishing links between contact information according to data validity of elementary files stored in smartcards, and more particularly, to a method of establishing links between contact information according to the correctness of the relationship between an index administration phone book elementary file and an abbreviated dialing numbers elementary file stored in smartcards.

2. Description of the Prior Art

Subscriber identity module (SIM) card is a smartcard that securely stores the international mobile subscriber identity (IMSI) used to identify and authenticate subscribers, short message service (SMS) data and contact information on mobile telephony devices. The hardware structure of a SIM card includes a central process unit (CPU), read-only memory (ROM), random access memory (RAM), electrically erasable programmable read-only memory (EEPROM), and an input/output (I/O) circuit. The hierarchical logic data structure of a SIM card includes 3 types of files: elementary file (EF), dedicated file (DF) and master file (MF).

The elementary files may adopt 3 main types of data structures for storing different types of data: transparent, linear fixed and cyclic. A transparent elementary file defines the data that is managed as a stream of bytes, which are addressed by an offset coming from the start of the file. A linear fixed elementary file or a cyclic elementary file is the data grouped into records, which is a block of bytes with a pre-defined size.

According to the 3rd Generation Partnership Project (3GPP) specification TS 31.102, the dedicated file $DF_{PHONEBOOK}$ contains all elementary files associated with the phone book, such as a phone book reference file elementary file $EF_{PBR}$ and other elementary files listed in the following table.

TABLE

| Name | Type 1 | Type 2 | Type 3 |
|---|---|---|---|
| $EF_{AAS}$ | | | X |
| $EF_{ADN}$ | X | | |
| $EF_{ANR}$ | X | X | |
| $EF_{EMAIL}$ | X | X | |
| $EF_{EXT1}$ | | | X |
| $EF_{GAS}$ | | | X |
| $EF_{GRP}$ | X | | |
| $EF_{IAP}$ | X | | |
| $EF_{PBC}$ | X | | |
| $EF_{SNE}$ | X | X | |
| $EF_{UID}$ | X | | |
| $EF_{CCP1}$ | | | X |

$EF_{AAS}$ represents an additional number Alpha string elementary file (Type 3). $EF_{ADN}$ represents an abbreviated dialing numbers elementary file (Type 1). $EF_{ANR}$ represents an additional number elementary file (Type 1 or Type 2). $EF_{EMAIL}$ represents an electronic mail elementary file (Type 1 or Type 2). $EF_{EXT1}$ represents an extension1 elementary file (Type 3). $EF_{GAS}$ represents a grouping information Alpha string elementary file (Type 3). $EF_{GRP}$ represents a grouping file elementary file (Type 1). $EF_{IAP}$ represents an index administration phone book elementary file (Type 1). $EF_{PBC}$ represents a phone book control elementary file (Type 1). $EF_{SNE}$ represents a second name entry elementary file (Type 1 or Type 2). $EF_{UID}$ represents a unique identifier elementary file (Type 1). $EF_{CCP1}$ represents a capability configuration parameters 1 elementary file (Type 3).

In the phone book reference file elementary file $EF_{PBR}$, the first file ID in the first record indicated using constructed Tag 'A8' is called a master EF. File IDs indicated using constructed Tag 'A8' correspond to a Type 1 EF. File IDs indicated using constructed Tag 'A9' correspond to a Type 2 EF. File IDs indicated using constructed Tag 'AA' correspond to a Type 3 EF. A Type 1 EF and a master EF contain the same number of records, and each record in the Type 1 EF is mapped to a corresponding record in the master EF on a one-to-one basis. A Type 2 EF contains fewer records than and a master EF, and each record in the Type 2 EF is linked to a corresponding record in the master 1 EF by a pointer indicated in the Type 1 index administration phone book elementary file $EF_{IAP}$. Each record in a Type 3 EF is linked to a corresponding record in the master EF by a record identifier with a record of the phone book reference file elementary file $EF_{PBR}$.

Assume that two entries associated with a specific contact are stored in the phone book of a SIM card, wherein the phone number of the specific contact is stored in the Type 1 abbreviated dialing numbers elementary file $EF_{ADN}$ and the electronic mail of the specific contact is stored in the Type 2 Email elementary file $EF_{EMAIL}$. The records of the Type 2 electronic mail elementary file $EF_{EMAIL}$ are linked to corresponding records of the Type 1 abbreviated dialing numbers elementary file $EF_{ADN}$ by corresponding pointers indicated in the Type 1 index administration phone book elementary file $EF_{IAP}$. When a user deletes the entries associated with the specific contact, the prior art method only erases corresponding data in $EF_{ADN}$ and $EF_{EMAIL}$ without handling $EF_{IAP}$. Therefore, an incorrect link still remains between a valid pointer of $EF_{IAP}$ and invalid data of $EF_{ADN}$ or $EF_{EMAIL}$. In the prior art, the mobile device may display blank contact information after the user deletes entries associated with the specific contact, thereby causing confusion and inconvenience to the user.

SUMMARY OF THE INVENTION

The present invention provides a method of establishing links between contact information according to data validity of elementary files in a smartcard. The method includes inserting the smartcard into a mobile device; accessing a first record in a first elementary file of the smartcard during a booting process of the mobile device; accessing a corresponding second record in a second elementary file of the smartcard according to a valid pointer when a content of the first record corresponds to the valid pointer; updating the first elementary file so that the content of the first record corresponds to an invalid pointer when a content of the second record corresponds to invalid data. The first elementary file includes at least one pointer for linking a specific record in a third elementary file of the smartcard to a specific record in the second elementary file. The second elementary file is used for storing a first entry associated with a contact. The third elementary file is used for storing a second entry associated with the contact.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating the phone book reference file elementary file $EF_{PBR}$ defined in the 3GPP specification TS 31.102.

FIG. 3 is a diagram illustrating the index administration phone book elementary file $EF_{IAP}$ defined in the 3GPP specification TS 31.102.

FIG. 4 is a diagram illustrating the abbreviated dialing numbers elementary file $EF_{ADN}$ defined in the 3GPP specification TS 31.102.

DETAILED DESCRIPTION

Figure 1:
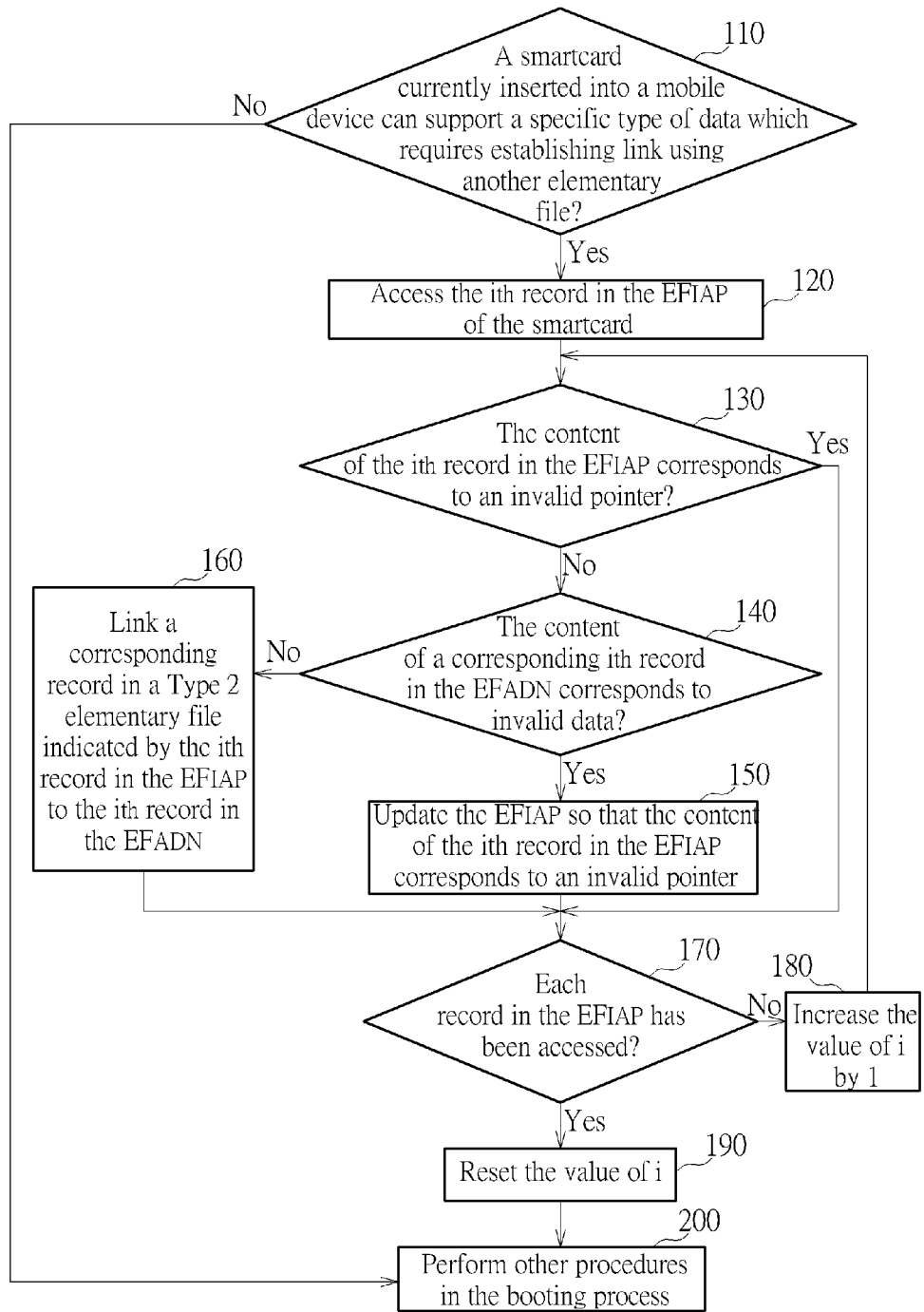
FIG. 1 is a flowchart illustrating a method of establishing links between contact information in smartcards according to the present invention.

The present invention provides a method of establishing links between contact information in smartcards. The present method may be applied to electronic devices including, but not limited to, mobile telephones, personal digital assistants, handheld computers, tablet computers, nettop computers, or laptop computers, or other devices with similar telecommunication capabilities. However, the type of mobile device does not limit the scope of the present invention.

The present method may be applied to mobile devices inserted with various types of smartcards including, but not limited to, a SIM card for global system for mobile communications (GSM) system, a USIM card for universal mobile telecommunications system (UMTS), or a removable user identity module (R-UIM) card/code division multiple access (CDMA) user identity module (CSIM) card for CDMA systems. However, the type of the smartcard does not limit the scope of the present invention.

The present method may be applied to a mobile device inserted with a smartcard of various sizes including, but not limited to, a standard Mini SIM card, a Micro SIM card or a Nano SIM card. However, the size of the smartcard does not limit the scope of the present invention.

FIG. 1 is a flowchart illustrating a method of establishing links between contact information in smartcards according to the present invention. The flowchart in FIG. 1 includes the following steps:

Step 110: during a booting process, determine whether a smartcard currently inserted into a mobile device can support a specific type of data which requires establishing link using another elementary file: if yes, execute step 120; if no, execute step 200.

Step 120: access the $i^{th}$ record in the index administration phone book elementary file $EF_{IAP}$ of the smartcard; execute step 130.

Step 130: determine whether the content of the $i^{th}$ record in the index administration phone book elementary file $EF_{IAP}$ corresponds to an invalid pointer: if yes, execute step 170; if no, execute step 140.

Step 140: determine whether the content of a corresponding $i^{th}$ record in the abbreviated dialing numbers elementary file $EF_{ADN}$ corresponds to invalid data: if yes, execute step 150; if no, execute step 160.

Step 150: update the index administration phone book elementary file $EF_{IAP}$ so that the content of the $i^{th}$ record in the index administration phone book elementary file $EF_{IAP}$ corresponds to an invalid pointer; execute step 170.

Step 160: link a corresponding record in a Type 2 elementary file indicated by the $i^{th}$ record in the index administration phone book elementary file $EF_{IAP}$ to the $i^{th}$ record in the abbreviated dialing numbers elementary file $EF_{ADN}$; execute step 170.

Step 170: determine whether each record in the index administration phone book elementary file $EF_{IAP}$ of the smartcard has been accessed: if yes, execute step 190; if no, execute step 180.

Step 180: increase the value of i by 1; execute step 130.

Step 190: reset the value of i; execute step 200.

Step 200: perform other procedures in the booting process.

For ease of illustration, assume that two entries associated with a specific contact are stored in the phone book of the smartcard, wherein the phone number of the specific contact is stored in the Type 1 abbreviated dialing numbers elementary file $EF_{ADN}$ and the electronic mail of the specific contact is stored in the Type 2 Email elementary file $EF_{EMAIL}$. The records of the Type 2 electronic mail elementary file $EF_{EMAIL}$ are linked to corresponding records of the Type 1 abbreviated dialing numbers elementary file $EF_{ADN}$ by corresponding pointers indicated in the Type 1 index administration phone book elementary file $EF_{IAP}$. In subsequent operations, the user may decide to delete all entries associated with the specific contact.

FIG. 2 is a diagram illustrating the phone book reference file elementary file $EF_{PBR}$ defined in the 3GPP specification TS 31.102. As depicted in field 11, the phone book reference file elementary file $EF_{PBR}$ adopts linear fixed structure. As depicted in field 12, bytes 1 to X (X is an integer larger than 1) are used to store the tab length value (TLV) objects for indicating elementary files which are part of the phone book structure. Other fields of the phone book reference file elementary file $EF_{PBR}$ are defined in detail in the 3GPP specification TS 31.102.

In step 110, the phone book reference file elementary file $EF_{PBR}$ in the smartcard may be accessed during the booting process of the mobile device in order to determine whether the smartcard support the specific type of data according to the TLV objects stored in bytes 1 to X. In an embodiment, the specific type of data may be the Type 2 additional number elementary file $EF_{ANR}$, the Type 2 electronic mail file $EF_{EMAIL}$, or the Type 2 second name entry elementary file $EF_{SNE}$ which can be linked to the abbreviated dialing numbers elementary file $EF_{ADN}$ by the pointers indicated in the index administration phone book elementary file $EF_{IAP}$. However, the above-mentioned embodiments do not limit the scope of the present invention.

FIG. 3 is a diagram illustrating the index administration phone book elementary file $EF_{IAP}$ defined in the 3GPP specification TS 31.102. As depicted in field 13, the index administration phone book elementary file $EF_{IAP}$ adopts linear fixed structure. As depicted in field 14, bytes 1 to X (X is an integer larger than 1) are used to store record numbers of the $1^{th}$ to $X^{th}$ object indicated after Tag 'A9'. Other fields of the index administration phone book elementary file $EF_{IAP}$ are defined in detail in the 3GPP specification TS 31.102.

In step 120, the $i^{th}$ record in the index administration phone book elementary file $EF_{IAP}$ of the smartcard may be accessed during the booting process, wherein i is an integer between 1 and X and the initial value of i may be set to 1.

In step 130, it is determined whether the content of the $i^{th}$ record in the index administration phone book elementary file $EF_{IAP}$ corresponds to an invalid pointer. According to the 3GPP specification TS 31.102, when the content of the $i^{th}$ record in the index administration phone book elementary file $EF_{IAP}$ is "FF", it indicates an invalid pointer and that no Type 2 elementary file needs to be linked to the $i^{th}$ record in the abbreviated dialing numbers elementary file $EF_{ADN}$. Under such circumstances, steps 170 and 180 are then executed so that the determination procedure in steps 120 and 130 may be performed on each record in the index administration phone book elementary file $EF_{IAP}$. When the content of the $i^{th}$ record in the index administration phone book elementary file $EF_{IAP}$ is not "FF", step 140 is then executed.

FIG. 4 is a diagram illustrating the abbreviated dialing numbers elementary file $EF_{ADN}$ defined in the 3GPP specification TS 31.102. As depicted in field 15, the abbreviated dialing numbers elementary file $EF_{ADN}$ adopts linear fixed structure. As depicted in field 16, bytes 1 to X (X is an integer larger than 1) are used to store dialing number and supplementary service control (SSC) Strings. Other fields of the abbreviated dialing numbers elementary file $EF_{ADN}$ are defined in detail in the 3GPP specification TS 31.102.

As previously stated, each record in the Type 1 index administration phone book elementary file $EF_{IAP}$ is mapped to a corresponding record in the master abbreviated dialing numbers elementary file $EF_{ADN}$ on a one-to-one basis. In step 140, it is determined whether the content of the $i^{th}$ record in the abbreviated dialing numbers elementary file $EF_{ADN}$ corresponds to invalid data.

According to the 3GPP specification TS 31.102, when the $i^{th}$ byte of the abbreviated dialing numbers elementary file $EF_{ADN}$ is "FF", it indicates the $i^{th}$ record in the abbreviated dialing numbers elementary file $EF_{ADN}$ contains invalid data. This scenario may occur after a previously stored phone number has been deleted, thereby resulting in an error link between the valid pointer of $EF_{IAP}$ and the invalid data of $EF_{ADN}$. Under such circumstances, step 150 is then executed for updating the index administration phone book elementary file $EF_{IAP}$ so that the content of the $i^{th}$ record in the index administration phone book elementary file $EF_{IAP}$ corresponds to an invalid pointer. Therefore, an error link between the valid pointer of $EF_{IAP}$ and the invalid data of $EF_{ADN}$ will no longer be present during the next booting process and only valid contact information will be displayed.

When the $i^{th}$ byte of the abbreviated dialing numbers elementary file $EF_{ADN}$ is not "FF", it indicates the $i^{th}$ record in the abbreviated dialing numbers elementary file $EF_{ADN}$ contains valid data. After confirming a correct link between the valid pointer of $EF_{IAP}$ and the valid data of $EF_{ADN}$, step 160 is then executed for linking the corresponding record in the Type 2 elementary file indicated by the $i^{th}$ record in the index administration phone book elementary file $EF_{IAP}$ to the $i^{th}$ record in the abbreviated dialing numbers elementary file $EF_{ADN}$. Therefore, all contact information associated with the specific contact (such as the phone number stored in the abbreviated dialing numbers elementary file $EF_{ADN}$ and the electronic mail address stored in the electronic mail elementary file $EF_{EMAIL}$) may be displayed when opening the phone book.

In steps 170 and 180, the determination procedure in step 130 or 140 may be performed on each record in the index administration phone book elementary file $EF_{IAP}$ for establishing a correct link between a valid pointer of the $EF_{IAP}$ and valid data of the $EF_{ADN}$, and updating corresponding contents of the $EF_{IAP}$ in response to an error link between a valid pointer of the $EF_{IAP}$ and invalid data of the $EF_{ADN}$.

In conclusion, the present invention may update the content of the index administration phone book elementary file $EF_{IAP}$ according to the correctness of the link between the index administration phone book elementary file $EF_{IAP}$ and the abbreviated dialing numbers elementary file $EF_{ADN}$ stored in a smartcard. When the user deletes a certain entry associated with a specific contact, the present invention deletes corresponding data in a Type 1/Type 2 elementary file and handles corresponding data in the index administration phone book elementary file $EF_{IAP}$ so that an incorrect link between a valid pointer of $EF_{IAP}$ and invalid data of the Type 1/Type 2 elementary file can be removed. Therefore, the present invention can present the mobile device from displaying blank contact information after the user deletes entries associated with the specific contact, thereby providing an accurate phone book and a user-friendly environment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of establishing links between contact information according to data validity of elementary files in a smartcard, comprising:
   inserting the smartcard into a mobile device;
   accessing a first record in a first elementary file of the smartcard during a booting process of the mobile device;
   accessing a corresponding second record in a second elementary file of the smartcard according to a valid pointer when a content of the first record corresponds to the valid pointer;
   updating the first elementary file so that the content of the first record corresponds to an invalid pointer when a content of the second record corresponds to invalid data, wherein:
     the first elementary file includes at least one pointer for linking a specific record in a third elementary file of the smartcard to a specific record in the second elementary file;
     the second elementary file is used for storing a first entry associated with a contact; and
     the third elementary file is used for storing a second entry associated with the contact.

2. The method of claim 1, further comprising:
   accessing a corresponding third record in the third elementary file according to the valid pointer when the content of the second record corresponds to valid data; and
   linking the third record to the second record.

3. The method of claim 1, further comprising:
   determining whether the smartcard supports a data type of the third elementary file according to a fourth elementary file of the smartcard during the booting process.

4. The method of claim 3, wherein the fourth elementary file is a phone book reference file elementary file ($EF_{PBR}$) defined in a 3rd Generation Partnership Project specification TS 31.102.

5. The method of claim 1, wherein the first elementary file is an index administration phone book elementary file ($EF_{IAP}$) defined in a 3rd Generation Partnership Project specification TS 31.102, and the second elementary file is an abbreviated dialing numbers elementary file ($EF_{ADN}$) defined in the 3rd Generation Partnership Project specification TS 31.102.

6. The method of claim 1, wherein the third elementary file is an additional number elementary file ($EF_{ANR}$), an electronic mail elementary file ($EF_{EMAIL}$) or a second name entry elementary file ($EF_{SNE}$) defined in a 3rd Generation Partnership Project specification TS 31.102.

7. The method of claim 1, wherein the first elementary file and the second elementary file is a Type 1 elementary file defined in a 3rd Generation Partnership Project specification TS 31.102, and the third elementary file is a Type 2 elementary file defined in the 3rd Generation Partnership Project specification TS 31.102.

8. The method of claim 1, wherein each record in the first elementary file is mapped to a corresponding record in the second elementary file on a one-to-one basis.

* * * * *